United States Patent [19]

Izumo et al.

[11] 4,418,046

[45] Nov. 29, 1983

[54] CATALYTIC OXIDATION APPARATUS

[75] Inventors: Masanori Izumo, Neyagawa; Keiichiro Kametani, Osaka; Sigehito Ota, Hirakata; Kenji Mikami, Takatsuki, all of Japan

[73] Assignee: Daikin Kogyo Kabushiki Kaisha, Osaka, Japan

[21] Appl. No.: 304,944

[22] Filed: Sep. 23, 1981

Related U.S. Application Data

[63] Continuation of Ser. No. 220,892, Dec. 29, 1980, abandoned, which is a continuation of Ser. No. 133,264, Mar. 24, 1980, abandoned.

[30] Foreign Application Priority Data

Apr. 4, 1979 [JP] Japan ................................. 54-45297

[51] Int. Cl.³ .......................................... B01D 53/36
[52] U.S. Cl. ................................. 423/245; 423/210; 423/247; 422/178; 422/188; 422/222; 422/223
[58] Field of Search ............... 423/210, 245, 246, 247, 423/239; 422/177, 178, 182, 222, 223

[56] References Cited

U.S. PATENT DOCUMENTS 3,758,666  9/1973  Frevel et al. ...................... 423/247
3,897,539  7/1975  Fleming .......................... 423/239 X
4,053,556  10/1977  Acres ............................. 423/245 X

*Primary Examiner*—Earl C. Thomas
*Attorney, Agent, or Firm*—Larson and Taylor

[57] ABSTRACT

A catalytic oxidation apparatus comprising a cylindrical honeycomb structure including a multiplicity of small passageways extending therethrough in parallel and having an oxidizing catalyst deposited thereon, a number of the passageways being separated as a catalyst regenerating zone from the other passageways, the regenerating zone being continuously shiftable throughout the entire honeycomb structure circumferentially thereof to render the honeycomb structure serviceable, from portion to portion, as the regenerating zone provided by the number of passageways.

3 Claims, 5 Drawing Figures

CATALYTIC OXIDATION APPARATUS

This is a continuation of the application Ser. No. 220,892 filed Dec. 29, 1980, and now abandoned, which is a continuation of application Ser. No. 133,264 filed Mar. 24, 1980, and now abandoned.

This invention relates to a catalytic oxidation apparatus, and more particularly to an apparatus for catalytically oxidizing gases containing carbon monoxide, aldehydes, lower alcohols, etc.

Platinum, palladium, manganese dioxide, etc. are known as useful catalysts for oxidizing organic compounds contained in gases. Such gases are subjected to oxidation treatment usually at a temperature of about 300° C. Although these oxidizing catalysts are serviceable effectively at room temperature for carbon monoxide, methanol, formalin and other compounds, the catalysts have the problem of becoming degraded usually when continuously used for about 8 to 100 hours presumably owing to poisoning, for example, with $NO_x$, high-boiling organic components, water or the like present in the gas. It is also known that the catalysts, when degraded, can be regenerated by being heated generally at a temperature of not lower than 80° C. Usually the catalyst is intermittently regenerated by being exposed to hot air heated to 80° C. or higher. However, exposure of the catalyst to hot air of a temperature as high as 80° C. or higher, even if effected intermittently, requires a large-capacity heat source, so that the oxidation apparatus, if installed indoors, will present difficulties about how to discharge the high-temperature gas.

The main object of this invention is to overcome the above difficulties and to provide a catalytic oxidation apparatus which is equipped with continuously regenerating means and which is operable with a small heat source without necessitating equipment for exhausting a high-temperature gas.

The present invention provides a catalytic oxidation apparatus comprising a cylindrical homeycomb structure including a multiplicity of small passageways extending therethrough in parallel and having an oxidizing catalyst deposited thereon, means for separating a number of the passageways as a catalyst regenerating zone from the other passageways serving as an oxidizing zone. The separating means is continuously shiftable throughout and relative to the entire homeycomb structure circumferentially thereof to render sequential portion of the honeycomb structure serviceable, as the regenerating zone provided by the number of passageways. The gas to be treated is introduced into the oxidizing zone from its one end, passed through the passageways therein and discharged from the other end of the oxidizing zone. During passage through this zone, the oxidizable substances are catalytically oxidized. During this treatment, hot air is similarly passed through the regenerating zone to regenerate the catalyst.

For a better understanding of this invention, the preferred embodiments of the invention will be described below in detail with reference to the accompanying drawings, in which.

Figure 1:
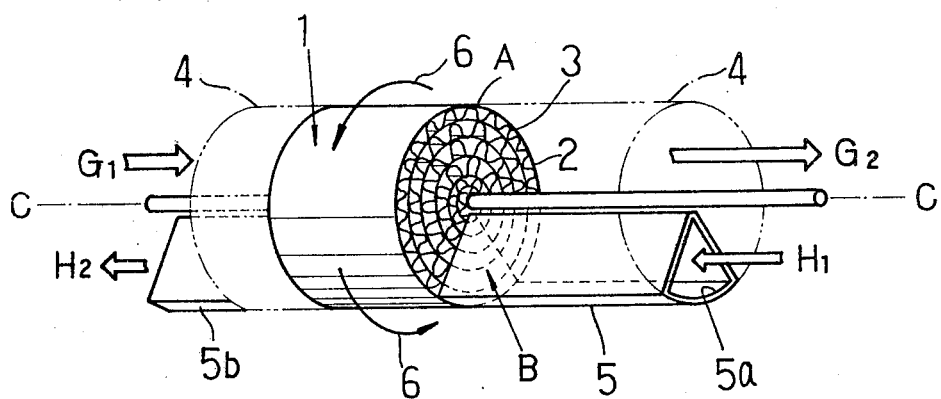
FIGS. 1 to 3 are schematic perspective views showing embodiments of the invention.
Figure 2:
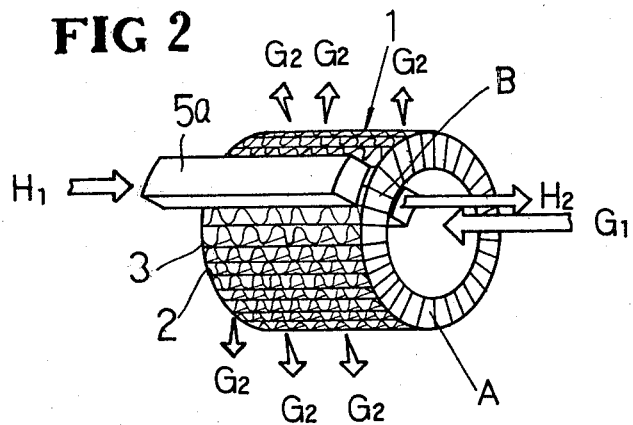
Figure 3:
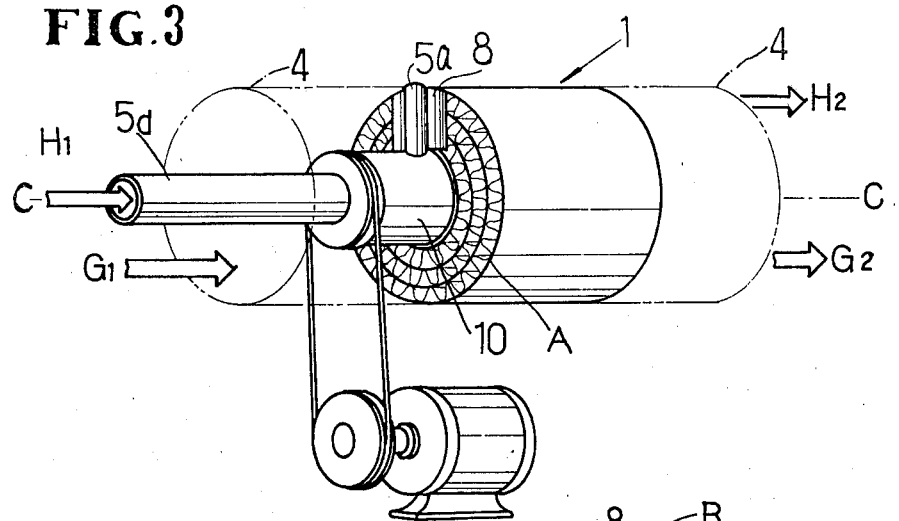

The first type of cylindrical honeycomb structures 1 useful in this invention comprise flat paper sheets 2 made from a mixture of inorganic fiber and porous inorganic material with a large specific surface area higher than 50 m²/g and corrugated paper sheets 3 made from the same mixture. The flat paper sheets 2 and the corrugated paper sheets 3 are alternately arranged and laminated to one another, with the ridges or furrows of the sheets 3 in alignment, to provide a large number of small passageways in parallel. The honeycomb structures 1 shown in FIGS. 1 and 3 are each a cylindrical laminate of flat paper sheets 2 and corrugated paper sheets 3 as arranged radially alternately and concentrically with respect to an axis C—C. These structures include gas passageways extending therethrough in parallel with the axis. FIG. 2 shows a hollow cylindrical honeycomb structure 1 including gas passageways arranged radially of the axis thereof. Thus the gas passageways have a cross section progressively decreasing from the outer periphery of the cylinder to its inner periphery. This structure can be fabricated by preparing a rectangular honeycomb structure having a length, width and thickness which correspond respectively to the outer circumference, length and wall thickness of the cylinder, and joining the upper and lower ends of the rectangular structure to each other so that the length thereof corresponds to the circumference of the cylinder. Since the sheets 2 and 3 are flexible although made of the above-mentioned materials, such honeycomb structures can be fabricated with ease.

Examples of inorganic fibers useful for the preparation of the sheets 2 and 3 include asbestos, glass fibers and rock wools. Among them, the asbestos are especially preferable, because they have positive charges in contrast with most of the porous inorganic materials exemplified below which have negative charges. Thus the asbestos can be uniformly mixed with the latter materials. The quality of asbestos to be used in the preparation of honeycomb structure of this invention is any of grade 1 to 6 according to Canadian Standard.

Examples of porous inorganic materials useful for the preparation of the sheets 2 and 3 are ceramics, active carbon, alumina, silica gel, zeolite, etc. which are heat-resistant and in the form of finely divided particles. These materials are used as the main component of carriers for the catalyst and give an increased surface area to the catalyst deposited thereon because they are porous and particulate. These particulate materials, when conjointly used with asbestos, can be incorporated into paper with a high degree of compactness since ceramics and like inorganic particles and pulp have negative charges while asbestos has positive charges. Additionally the inorganic materials have high resistance to heat and chemicals required of the main component of the oxidation apparatus.

The paper to be used in the above first type of honeycomb structure of this invention is prepared in the following manner. About 30 to about 60% by weight of asbestos, about 40 to about 70% by weight of porous inorganic material, some percent of organic binder and the balance pulp are mixed together and the mixture is made into paper by usual methods, for example, using Fourdrinier paper machine and cylinder paper machine. Preferably the flat paper sheet is thus obtained in about 0.1 to about 0.5 m in thickness. The organic binders are needed for imparting strength to the paper but are disadvantageous in the detriment to catalytic activity. For this reason, silica sol, alumina sol or like inorganic binder is impregnated into the structure, according to this invention, before or after the structure is heated at 100° to 500° C., preferably 250° to 450° C. at oxygen concentration of up to 10% preferably up to 3%. Corrugated sheets are prepared from such flat sheets with a flute diameter of 1.5 to 4 mm by a corrugating machine. The corrugated sheet thus prepared is affixed to the flat sheet to obtain a composite sheet having corrugations on one side. Such composite sheets are then laminated in a concentric arrangement, whereby the cylindrical structure shown in FIG. 1 or 3 is obtained. The method of making the structure of FIG. 2 has already been described.

According to another embodiment, cylindrical honeycomb structures useful in this invention are made from ceramics. For the preparation of the present cylindrical honeycomb structure, the organic binder as mentioned above is added to ceramics materials such as $2MgO.2Al_2O_3.5SiO_2$, $3Al_2O_3.2SiO_2$ and $MgO.SiO_2$. Then the admixture is pressed and/or calendered to prepare sheets which are corrugated. The corrugated sheets are made into a cylindrical honeycomb structure which is subsequently fired at a temperature as high as 1,000° to 1,400° C. The honeycomb structure thus obtained is not porous in contrast with the honeycomb structure of the first embodiment made from the inorganic fibers. Thus, in order to deposit an acid catalyst on the surface of the structure, it is necessary to subject the surface thereof to a treatment for rendering it porous so that the carrier for the catalyst is serviceable. Typical of the treatment is the $\gamma$-$Al_2O_3$ coating process. The $\gamma$-$Al_2O_3$ has a specific surface area of about 300 to 400 m$^2$/g and is useful as an excellent carrier for the catalyst.

The catalyst can be deposited on the structure by the usual immersion method or by any of various coating methods, for example, by coating all the surfaces defining the passageways with a solution containing the desired catalyst metal, such as a solution of chloroplatinic acid, and reducing the coating. The application of the catalyst solution is not always limited to the structure as fabricated to the desired shape, but the catalyst solution can be applied to the flat sheets and/or corrugated sheets, or corrugated composite sheets to be fabricated into a honeycomb structure.

The structure of this invention having the catalyst thus deposited thereon is used as separated into an oxidizing zone A for passing therethrough the gas G to be treated and a regenerating zone B for passing hot air H therethrough to regenerate the catalyst. Stated more specifically, a number of the passageways in the structure are separated as the catalyst regenerating zone B from the other passageways serving as the oxidizing zone A. The zone A is held in communication with a passage 4 for the gas to be treated, while the zone B is held in communication with a hot air passage 5. The regenerating zone B is continuously shifted throughout the entire honeycomb structure 1 circumferentially thereof by the rotation of the structure 1 as seen in FIG. 1 or FIG. 2, or by the revolution of the air passage 5 as seen in FIG. 3. Thus the honeycomb structure is serviceable, from portion to portion, as the regenerating zone B which is provided by a specified number of passageways. Usually the area of the zone B is about 1/10 to about 1/500 of the whole passageway area. Accordingly the amount of hot air passed through the zone B is about 1/10 to about 1/500, preferably about 1/20 to about 1/200 of the amount of gas passed through the zone A for oxidation. The structure 1 or the hot air passage is rotated or revolved very slowly, usually one turn every several hours.

The embodiments shown in FIGS. 1 to 3 will now be described in greater detail.

With reference to FIG. 1, the cylindrical structure rotatable in the direction of arrows 6 is placed in a gas passage 4, which is partly divided to provide a hot air passage 5. The hot air passage 5 includes a front inlet portion 5a and a rear outlet portion 5b which are defined by separate members so as not to interfere with the rotation of the structure 1. In cross section, the passage 5 corresponds to a sector of the circular end face of the structure 1 and has 1/10 to 1/500 of the area of the end face. With this apparatus, the gas $G_1$ to be treated is introduced into the structure 1 at its one end from the passage 4, subjected to oxidation while flowing through the small passageways in the zone A and run off from the other end of the structure 1 in the form of an oxidized gas $G_2$. For the regeneration of the catalyst, hot air $H_1$ is fed to the passageways in the zone B from the inlet portion 5a, brought into contact with the catalyst for regeneration and thereafter discharged, as indicated at $H_2$, through the outlet portion 5b.

The structure of FIG. 2 has the construction already described in which all the small passageways extend radially of the structure 1. Provided in contact with the outer periphery of the structure 1 is a hot air inlet member 5a extending in parallel to the axis of the structure 1 and opposed to a hot air outlet member provided on the inner periphery of the structure 1. The structure 1 is rotated about its own axis, with its peripheral wall passing across the hot air passage between the inlet member 5a and an outlet member from which hot air $H_2$ exits. The gas $G_1$ to be treated is led into the hollow cylinder 1, introduced into the small passageways of zone A from the cylinder inner periphery, catalytically oxidized while flowing through the passageways radially outward and discharged from the outer periphery as an oxidized gas $G_2$. Hot air $H_1$ is passed through the passageways in the zone B from the inlet 5a to the outlet 5b to regenerate the catalyst and is run off as air $H_2$.

Figure 5:
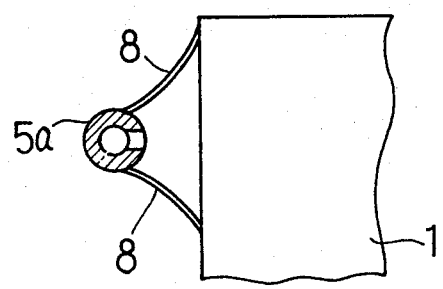
FIG. 5 is a view in section taken along the line A—A in FIG. 4.
Figure 4:
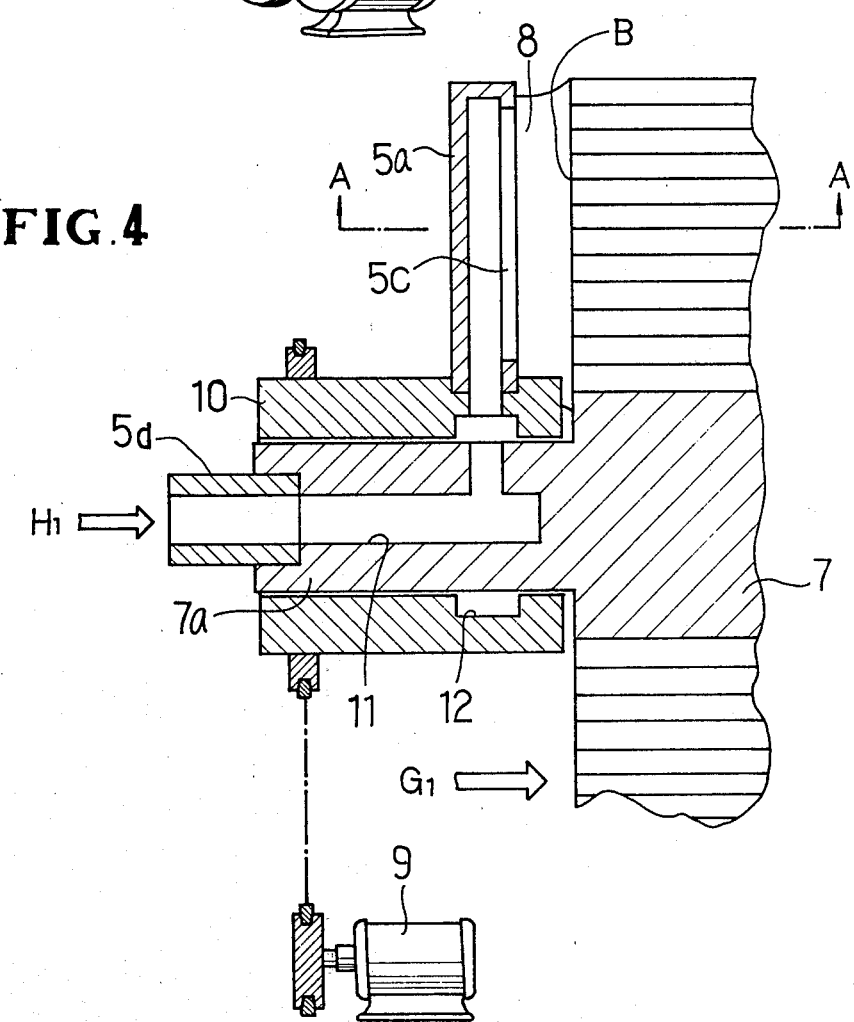
FIG. 4 is an enlarged view in section showing the hot air inlet portion of embodiment illustrated in FIG. 3.

The structure 1 shown in FIG. 3 has the same construction as shown in FIG. 1 in that it includes laminated honeycomb layers arranged concentrically with its center shaft and having small passageways extending in parallel with its axis C—C. The honeycomb structure is disposed in a gas passage 4 but is not rotatable. As is the case with FIG. 1, the gas $G_1$ to be treated is let into the oxidizing zone A of the structure from its one end, run off from the other end thereof as indicated at $G_2$ and is thereby oxidized. As is also illustrated in FIGS. 3, 4, and 5, similarly numbered apparatus elements being the same in each Figure, the structure 1 is provided with a hot air inlet member 5a which is turnable at the first-mentioned end of the structure 1 to feed hot air to the small passageways in the zone B. The inlet member 5a is in the form of a tube having an air opening 5c (FIG. 4) and is provided with a skirt 8 for preventing leakage of hot air. The inlet member 5a is fixed to a rotatable ring 10 fitting around an extension 7a of the center shaft 7 and driven by an electric motor 9. The extension 7a is formed with a hot air channel 11 having an outer end communicating with a hot air main pipe 5d and an inner end in communication, through a circumferential groove 12 in the rotatable ring 10, with the hot air passage provided by the inlet member 5a. Thus hot air $H_1$ is led through the pipe 5d, channel 11, groove 12, the passage formed by inlet member 5a and opening 5c and introduced into the small passageways in the zone B. The exit air is indicated at $H_2$. The gas $G_1$ to be treated is passed through the structure in the same manner as in FIG. 1 and oxidized to gas $G_2$.

The invention will be further described with reference to the following example.

EXAMPLE

A slurry is prepared from 100 parts by weight of water, 60 parts by weight of finely divided active carbon not larger than 100μ in particle size, 40 parts by weight of asbestos fiber of grade 6 according to the Canadian standard, 3 parts by weight of urea resin and 1 part by weight of acrylic resin, the resins serving as binders. With use of a cylinder paper machine, the slurry is made into a paper sheet 0.15 mm in thickness and weighing 80 g/m². With use of a corrugating machine, the sheet is made into composite sheets comprising a flat sheet and a corrugated sheet affixed to the flat sheet and having a flute diameter of 1.5 mm. The composite sheets are fabricated into a cylindrical honeycomb structure, as shown in FIG. 1, 100 mm in thickness and 500 mm in diameter. Palladium is deposited on the structure in an amount of 2 g per liter of the volume of the structure.

The structure is assembled into the same arrangement as shown in FIG. 1, with a hot air passage having an apex angle of 3.6 degrees in cross section and provided by inlet and outlet members which are fitted to the structure with rubber sheets used at the sliding portions. The structure is driven one turn every 5 hours, and air containing 80 ppm of carbon monoxide is passed through the structure at 25° C. at a rate of 26 m³/min. Hot air is also fed to the hot air passage at 200° C. at a rate of 0.3 m³/min. Table 1 shows the results achieved.

TABLE 1

| Operating hours | CO concentration in treated air (ppm) | |
| --- | --- | --- |
| | With hot air supply | Without hot air supply |
| 1 | 8 | 7.2 |
| 10 | 7.2 | 8.4 |
| 100 | 9.6 | 56 |
| 500 | 6.6 | 58 |
| 1000 | 10.8 | — |

We claim:

1. A process for catalytically oxidizing a gas containing at least one member selected from a group consisting of carbon monoxide, formaldehyde and methyl alcohol comprising
   (i) utilizing a catalytic oxidation apparatus comprising a cylindrical honeycomb structure including a multiplicity of small passageways extending therethrough in parallel and having an oxidizing catalyst deposited thereon, means for separating a number of the passageways as a catalyst regenerating zone from the other passageways serving as an oxidizing zone, said oxidizing zone being held in communication with a passage for the gas and said catalyst regenerating zone being held in communication with a passage for hot air, means for providing continuously shifting of the passageways which constitute the regenerating zone, and hence those which constitute the ozidizing zone, throughout the entire honeycomb structure circumferentially thereof to continuously render sequential portions of the honeycomb structure serviceable, from portion to portion, as the regenerating zone provided by said number of passageways, the area of the regenerating zone constituting 1/10 to 1/500 of the whole passageway area; and
   (ii) introducing said gas containing at least one member selected from the group consisting of carbon monoxide, formaldehyde and methyl alcohol into the catalytic oxidation apparatus at a room temperature; and simultaneously introducing a hot gas into the regenerating zone at a temperature of a least 80° C., while continuously shifting said regenerating zone circumferentially of said honeycomb structure.

2. A process for catalytically oxidizing gases according to claim 1 in which the honeycomb structure comprises flat paper sheets and corrugated paper sheets arranged alternately and laminated to one another with the ridges of the corrugated sheets in alignment, the flat and corrugated sheets being made from a mixture of inorganic fiber and a porous inorganic material with a specific surface area higher than 50 m²/g.

3. A process for catalytically oxidizing gases according to claim 1 in which the honeycomb structure comprises flat paper sheets and corrugated paper sheets arranged alternately and laminated to one another with the ridges of the corrugated sheets in alignment, the flat and corrugated sheets being made of ceramic materials coated by porous catalyst carrier.

* * * * *